(12) United States Patent
Shah et al.

(10) Patent No.: US 10,503,447 B2
(45) Date of Patent: Dec. 10, 2019

(54) PRINT FLUID SELECTION

(71) Applicant: Hewlett-Packard Development Company, L.P., Houston, TX (US)

(72) Inventors: Kirti Kunal Shah, Bangalore (IN); Satish Babu Natarajan, Bangalore (IN)

(73) Assignee: Hewlett-Packard Development Company, L. P., Spring, TX (US)

( * ) Notice: Subject to any disclaimer, the term of this patent is extended or adjusted under 35 U.S.C. 154(b) by 561 days.

(21) Appl. No.: 14/966,272

(22) Filed: Dec. 11, 2015

(65) Prior Publication Data

US 2017/0168762 A1 Jun. 15, 2017

(51) Int. Cl.
*G06F 3/12* (2006.01)
*G06K 15/02* (2006.01)
*G06K 15/00* (2006.01)

(52) U.S. Cl.
CPC .......... *G06F 3/1219* (2013.01); *G06F 3/1239* (2013.01); *G06F 3/1254* (2013.01); *G06F 3/1285* (2013.01); *G06K 15/1823* (2013.01); *G06K 15/1878* (2013.01); *G06K 15/407* (2013.01)

(58) Field of Classification Search
CPC .................................................... G06F 3/1219
See application file for complete search history.

(56) References Cited

U.S. PATENT DOCUMENTS

| | | | |
|---|---|---|---|
| 7,084,992 B1* | 8/2006 | Amarger | G06F 3/1296 358/1.13 |
| 7,944,581 B2 | 5/2011 | Shepherd et al. | |
| 8,836,977 B2 | 9/2014 | Wu et al. | |
| 8,891,125 B2 | 11/2014 | Sprague et al. | |
| 9,032,284 B2 | 5/2015 | Arora et al. | |
| 2003/0047099 A1* | 3/2003 | Hanyu | H04N 1/603 101/484 |
| 2003/0076512 A1* | 4/2003 | Laughlin | H04N 1/393 358/1.2 |
| 2004/0017577 A1 | 1/2004 | Ostrover et al. | |

(Continued)

FOREIGN PATENT DOCUMENTS

EP 2696276 A1 2/2014

OTHER PUBLICATIONS

Moin, "Print of PDF with CleanPrint: Select Which Parts of a Webpage You Want Printed [Chrome]", www.makeuseof.com/tag/author/moin/, Jan. 10, 2013, 2 pages.

*Primary Examiner* — Ibrahim Siddo
(74) *Attorney, Agent, or Firm* — Brooks Cameron & Huebsch PLLC

(57) ABSTRACT

Example implementations relate to print fluid selection. For example, a system for print fluid detection may include a cloud-based printing platform coupled to a plurality of printing devices. A print fluid selection module may be implemented in the cloud-based printing platform. The print fluid selection module may determine a type of document to be printed by a printing device among the plurality of printing devices, and select a print fluid setting among a plurality of print fluid settings for printing the document, based on the determined document type. The printing fluid selection may be enabled only for printing devices that include authentic components, as verified by a printing supply verification module.

14 Claims, 3 Drawing Sheets

(56) References Cited

U.S. PATENT DOCUMENTS

| | | | |
|---|---|---|---|
| 2004/0223197 A1* | 11/2004 | Ohta | G06F 17/30271 |
| | | | 358/538 |
| 2005/0243116 A1* | 11/2005 | Ward | B41J 2/17546 |
| | | | 347/19 |
| 2008/0205751 A1* | 8/2008 | Mischler | H04N 1/38 |
| | | | 382/163 |
| 2011/0170146 A1* | 7/2011 | Simpson | B41J 2/17546 |
| | | | 358/3.28 |
| 2014/0270813 A1* | 9/2014 | Ignatchenko | B41J 2/17546 |
| | | | 399/12 |

\* cited by examiner

PRINT FLUID SELECTION

BACKGROUND

Documents may include text, images, lines, and other items to be printed. Printing documents as they are presented may consume a tremendous amount of resources, such as printing fluids. Modifying the items printed on the document may reduce the amount of resources used.

DETAILED DESCRIPTION

Printing documents in a cloud environment, or enterprise web environment, may not provide multiple choices to users to optimize print fluid usage. As used herein, print fluid or printing fluid may refer to ink and toner, among other fluids used to print documents and/or objects with a printing device. Printer companies may strive to reduce the cost of printing by reducing the amount of print fluid used in each job, while ensuring that the content is readable, and the reduction of print fluid does not result in a loss of intelligence in the content printed.

In accordance with the present disclosure, printing fluid selection allows various print fluid settings may be used to reduce the amount of printing fluid used, which may be selected based on content in the document and/or object to be printed. As used herein, a print fluid setting refers to instructions executable by a processor to modify settings on a physical printing device. These print fluid settings may be pre-determined, such as by a user and/or administrator, and may be saved in a cloud based printing environment, as described herein. Further, as discussed herein, printing fluid selection may be enabled only for printing devices that confirm genuine supplies. Put another way, the printing fluid selection instructions may be enabled only for printing devices which include authentic components, as specified by a manufacturer. For instance, if manufacturer A manufactured a printing device, authentic parts may refer to components of the printing device that are either manufactured by manufacturer A, or verified by manufacturer A to be from an approved supplier.

Figure 1:
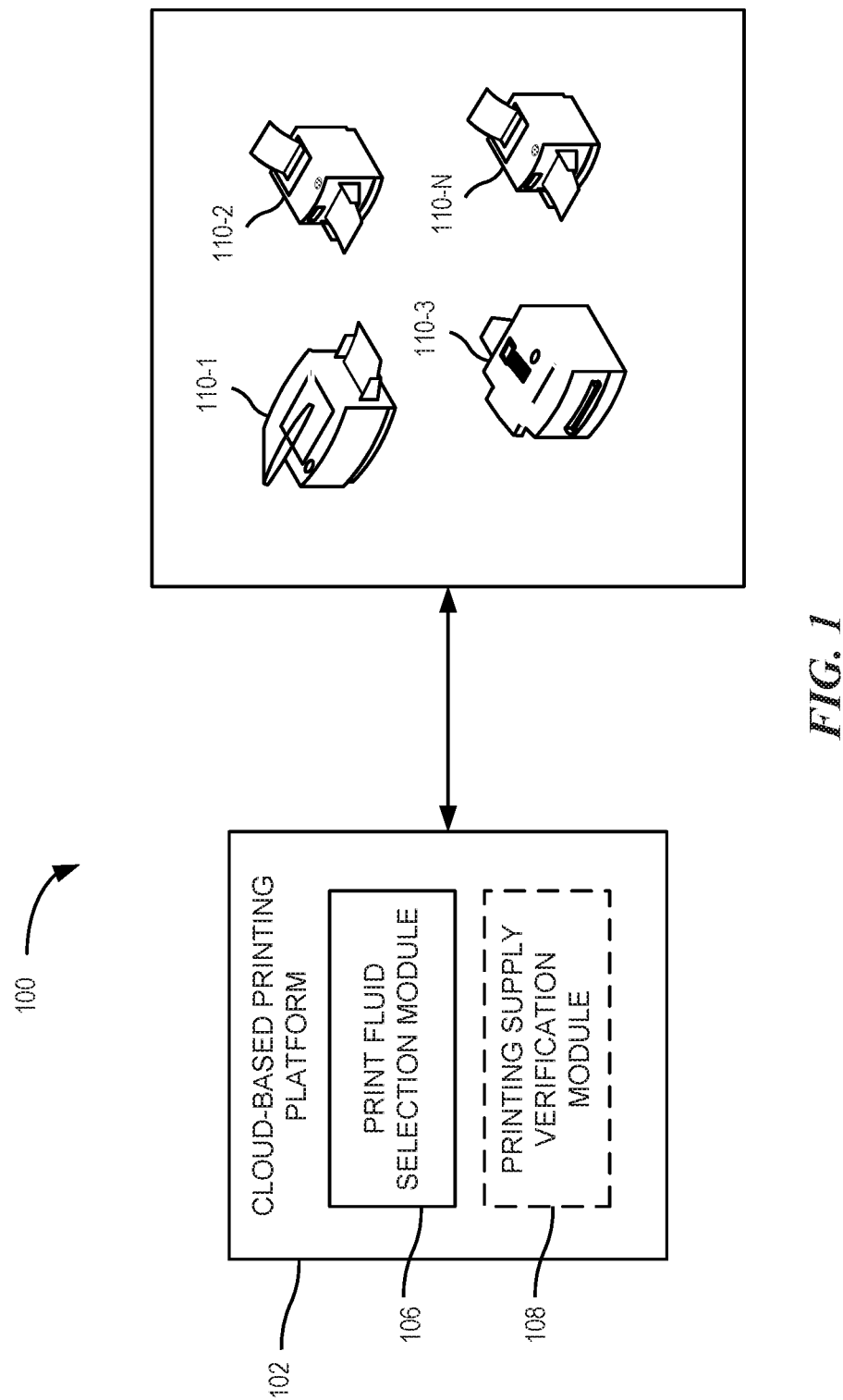
FIG. 1 illustrates a diagram of an example system for print fluid selection, according to the present disclosure.

FIG. 1 illustrates a diagram of an example system 100 for print fluid selection, according to the present disclosure. As illustrated in FIG. 1, the system 100 may include a cloud-based printing platform 102 coupled to a plurality of printing devices 110-1, 110-2, 110-3, 110-N (collectively referred to herein as printing devices 110). Also, as illustrated in FIG. 1, a print fluid selection module 106 may be implemented in the cloud-based printing platform 102. As used herein, a module may refer to instructions executable by a physical processor to perform a particular action. As such, the print fluid selection module 106 may include instructions executable by a physical processor in the cloud-based printing platform 102, to perform particular actions on the printing devices 110.

The print fluid selection module 106 may perform a number of actions. For instance, the print fluid selection module 106, when executed by the cloud-based printing platform 102, may determine a type of a document to be printed by a printing device among the plurality of printing devices 110. The system 100 may execute instructions which analyze the document type and invoke necessary print fluid settings to save printing fluid, while maintaining the readability of the document. As used herein, the document type refers to the type of a broadly characterized type of content associated with the document, based on a relative percentage of text, images, and superimposed images. For instance, a first type of document may include content that contains multiple images and lesser text and superimposed content. Put another way, the first type of document may have less than a threshold percentage of text, and more than a threshold percentage of images. A second type of document may include less images and more text than the first type of document. Put another way, the second type of document may include less than a threshold percentage of images and more than a threshold percentage of text. In some examples, the threshold percentage of text and the threshold percentage of images used to define the first type of document may be the same thresholds used to define the second type of document. For instance, a threshold of images of 60% and a threshold of text of 40% may be used. If the document includes 61% images and 39% text, then the cloud-based printing platform 102 may determine that the type of the document is of the first type. However, if the document includes 58% images and 42% text, then the cloud-based printing platform 102 may determine that the type of the document is of the second type.

Still further, the cloud-based printing platform 102 may determine that the type of the document is of a third type. The third type of document may include primarily text, as opposed to images. Put another way, the third type of document may have more than a second threshold percentage of text. For instance, if a first threshold of 40% was used to define the second document type, a threshold of 80% may be used to define the third document type. Hence, a document including at least 80% text may be determined to be of the third type, a document including between 40% and 80% text may be determined to be of the second type. Yet further, if the document is determined to include less than 40% text, then the document may be determined to be of the first type.

While various percentages of content are used herein, it should be noted that such relative percentages are used for illustrative purposes only. Other relative threshold percentages may be used to define each document type. In fact, the threshold percentages that define each document type may in some sense be user-configurable. For instance, a user and/or administrator of the system 100 may set preferences over the cloud print account based on document type. That is, the user and/or administrator may define which actions are performed by the plurality of printers 110, in response to identification of a particular document type.

The print fluid selection module 106 may select a print fluid setting among a plurality of print fluid settings for printing the document, based on the determined document type. As used herein, a print fluid setting refers to a series of instructions that modify how a document is printed, such that printing fluid is used in a most efficient manner without compromising the readability of the document to be printed, as discussed further in relation to FIG. 2.

In some examples, the cloud-based printing platform 102 may include a printing supply verification module 108 to verify authenticity of components in a printing device among the plurality of printing devices 110, in response to receiving component information from the printing device. As used herein, to verify the authenticity of components refers to verifying a manufacturer and/or other identifiable information about the components of the printing device. For instance the printing supply verification module 108 may verify that all components within the printing device originated from a same, or at least a particular, manufacturer. That is, the printing supply verification module 108 may determine that the printing fluid cartridge is manufactured by a particular manufacturer. As such, the cloud-based printing platform 102 may verify the authenticity of components within a printing device, and execute the print fluid selection module 106 in response to the verification. Put another way, the cloud-based printing platform 102 may, in some examples, execute the print fluid selection module 106 only after the printing supply verification module 108 verifies the authenticity of components within the printing device. However, examples are not so limited, and the print fluid selection module 106 may execute without verification of the authenticity of components.

Figure 2:
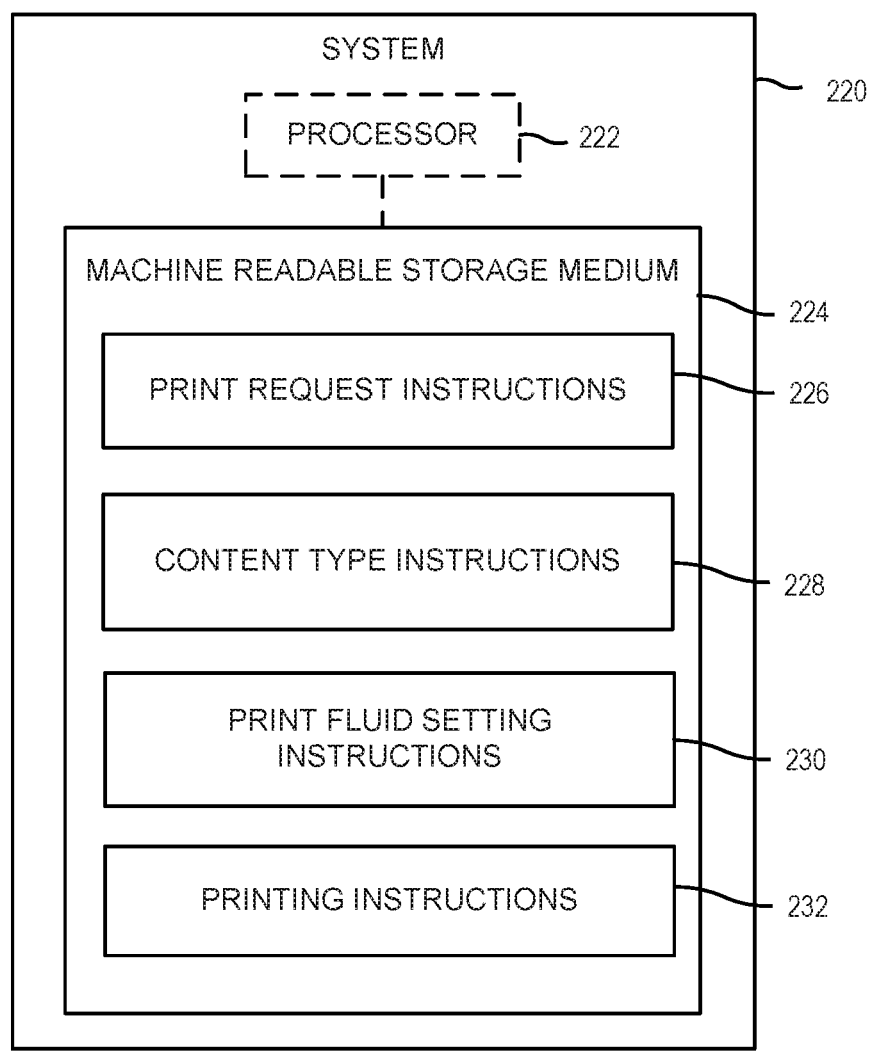
FIG. 2 is a block diagram of an example system for print fluid selection, according to the present disclosure.

FIG. 2 is a block diagram of an example system 220 for print fluid selection, according to the present disclosure. System 220 may include at least one computing device that is capable of communicating with at least one remote system. In the example of FIG. 2, system 220 includes a processor 222 and a machine-readable storage medium 224. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 222 may be one or more central processing units (CPUs), microprocessors, and/, or other hardware devices suitable for retrieval and execution of instructions stored in machine-readable storage medium 224. In the particular example shown in FIG. 2, processor 222 may receive, determine, and send instructions 226, 228, 230, 232 for print fluid selection. As an alternative or in addition to retrieving and executing instructions, processor 222 may include one or more electronic circuits comprising a number of electronic components for performing the functionality of one or more of the instructions in machine-readable storage medium 224. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 224 may be any electronic, magnetic, optical, or other physical storage device that stores executable instructions. Thus, machine-readable storage medium 224 may be, for example, Random Access Memory (RAM), an Electrically-Erasable Programmable Read-Only Memory (EEPROM), a storage drive, an optical disc, and the like. Machine-readable storage medium 224 may be disposed within system 220, as shown in FIG. 2. In this situation, the executable instructions may be "installed" on the system 220. Additionally and/or alternatively, machine-readable storage medium 224 may be a portable, external or remote storage medium, for example, that allows system 220 to download the instructions from the portable/external/remote storage medium. In this situation, the executable instructions may be part of an "installation package". As described herein, machine-readable storage medium 224 may be encoded with executable instructions for print fluid selection.

Referring to FIG. 2, print request instructions 226, when executed by a processor (e.g., 222), may cause system 220 to receive a request to print a document using a printing device in a cloud-based printing platform. For example, a user of the system 100 may request, from the cloud-based printing platform 102, to print a document using one of the printing devices 110. In response to receiving the request to print the document, the cloud-based printing platform 102 may analyze the content of the document to determine a content type for the document. As such, content type instructions 228, when executed by a processor (e.g., 222) may cause the system 220 to assign a content type for the document based on an amount of text and an amount of images in the document. As discussed in relation to FIG. 1, assigning a content type to the document may be performed using relative threshold amounts of text and/or images.

Print fluid setting instructions 230, when executed by a processor (e.g., 222), may cause system 220 to select a print fluid setting among a plurality of print fluid settings for printing the document on the printing device, based on the content type. For instance, as discussed in relation to FIG. 1, a plurality of print fluid settings may be used to preserve printing fluid. For ease of understanding, three print fluid settings are discussed herein, described as "low", "medium" and "high". The designations of "low", "medium" and "high" are relative terms, and merely describe the relative changes to the document while printing. Put another way, the "low" print fluid setting may result in the least amount of changes to the document during printing, whereas the "medium" print fluid setting may result in an intermediate amount of changes (relative to the "low" and "high" print fluid settings), and the "high" print fluid setting may result in the greatest amount of changes to the document during printing.

Each of the plurality of print fluid settings may define various changes made to the document during printing such that printing fluid may be preserved. Further, each of the plurality of print fluid settings may be applied to a particular document type. For instance, as discussed herein, a content type for the document may be determined, such that the document is one of a first content type, a second content type, or a third content type. If the document is assigned a first content type, the "low" print fluid setting may be selected. If the document is assigned a second content type, the "medium" print fluid setting may be selected. Furthermore, if the document is assigned a third content type, the "high" print fluid setting may be selected.

For the ease of understanding, the "low", "medium", and "high" print settings may be summarized in the following table:

| Print Fluid Setting | Low | Medium | High |
| --- | --- | --- | --- |
| Replace others with Garamond font | Yes | Yes | Yes |
| Replace bold text with regular and underline it (dotted) | Yes | Yes | Yes |
| Limit bold text to 11 point size and limit non-bold text to 8 point size | Yes | Yes | Yes |
| Replace solid lines with dotted lines | Yes | Yes | Yes |
| Remove background full page colors | No | Yes | Yes |
| Limit picture depth to grayscale | No | No | Yes |
| Use only black cartridge | No | No | Yes |
| Apply half toning on images | No | No | Yes |

As such, the content type instructions 228 may include instructions to assign a first print fluid setting (e.g., "low") among the plurality of print fluid settings to the document in response to a determination that more than a threshold portion of the document comprises images rather than text. In another example, the content type instructions 228 may include instructions to assign a second print fluid setting (e.g., "medium") among the plurality of print fluid settings to the document in response to a determination that less than a threshold portion of the document comprises images, more than a first threshold portion of the document comprises text, but less than a second threshold portion of the document comprises text. Similarly, the content type instructions 228 may include instructions to assign a third print fluid setting (e.g., "high") among the plurality of print fluid settings to the document in response to a determination that more than a second threshold portion of the document comprises text rather than images, as discussed in relation to FIG. 1.

The printing instructions 232, when executed by a processor (e.g., 222), may cause system 220 to print the document using the printing device and the selected print fluid setting. For example, if the document is determined to be of a first type, and the "low" print fluid setting is assigned, then the document may be printed, using one of the plurality of printing devices 110, and using the "low" print fluid setting. As such, the printing instructions 232 may include instructions to modify the document according to the "low" print fluid setting. For instance, the printing instructions 232 may include instructions to replace text in the document with a pre-defined font type, such as replacing all text that is not in Garamond font, to Garamond. Examples are not so limited, however, and other types of font may be used. Similarly, the printing instructions 232 may include instructions to replace text in the document with a pre-defined font size. For instance, text that is in bold format may be limited to 11 point font size, and text that is not in bold format may be limited to 8 point font size. Moreover, the printing instructions 232 may include instructions to replace bold text in the document with a pre-defined text format. For instance, text that is in bold format, may be replaced with regular (e.g., not bold) text, and underlined with a dotted line. As such, the originally bolded text may still stand out visually on the printed document, with less printing fluid used.

Also, if the document is determined to be of a second type, and the "medium" print fluid setting is assigned, then the document may be printed, using one of the plurality of printing devices 110, and using the "medium" print fluid setting. As such, the printing instructions 232 may include instructions to modify the document according to the "medium" print fluid setting. The "medium" print fluid setting may include all of the modifications included in the "low" print fluid setting, plus additional modifications. For instance, the printing instructions 232 may include instructions to modify the document according to the first print fluid setting (e.g., the "low" print fluid setting) and also remove background full page colors in the document. As such, any background colors in the document to be printed may instead be left white.

Last, if the document is determined to be of a third type, and the "high" print fluid setting is assigned, then the document may be printed, using one of the plurality of printing devices 110, and using the "high" print fluid setting. As such, the printing instructions 232 may include instructions to modify the document according to the "high" print fluid setting. The "high" print fluid setting may include all of the modifications included in the "low" and "medium" print fluid settings, plus additional modifications. For instance, the printing instructions 232 may include instructions to modify the document according to the second print fluid setting (e.g., the "medium" print fluid setting) and also limit picture depth to grayscale, use only black ink, and apply half toning to images in the document.

In such a manner the processor 222 may execute instructions stored in machine-readable storage medium 224 to save printing fluid by reducing the number of dots that are printed by the printing device. The first, second, and third print fluid settings may be mapped in the cloud-printing platform for a specific printing device. The modifications described above may be adopted in the cloud while rendering for a specific target printer.

Figure 3:
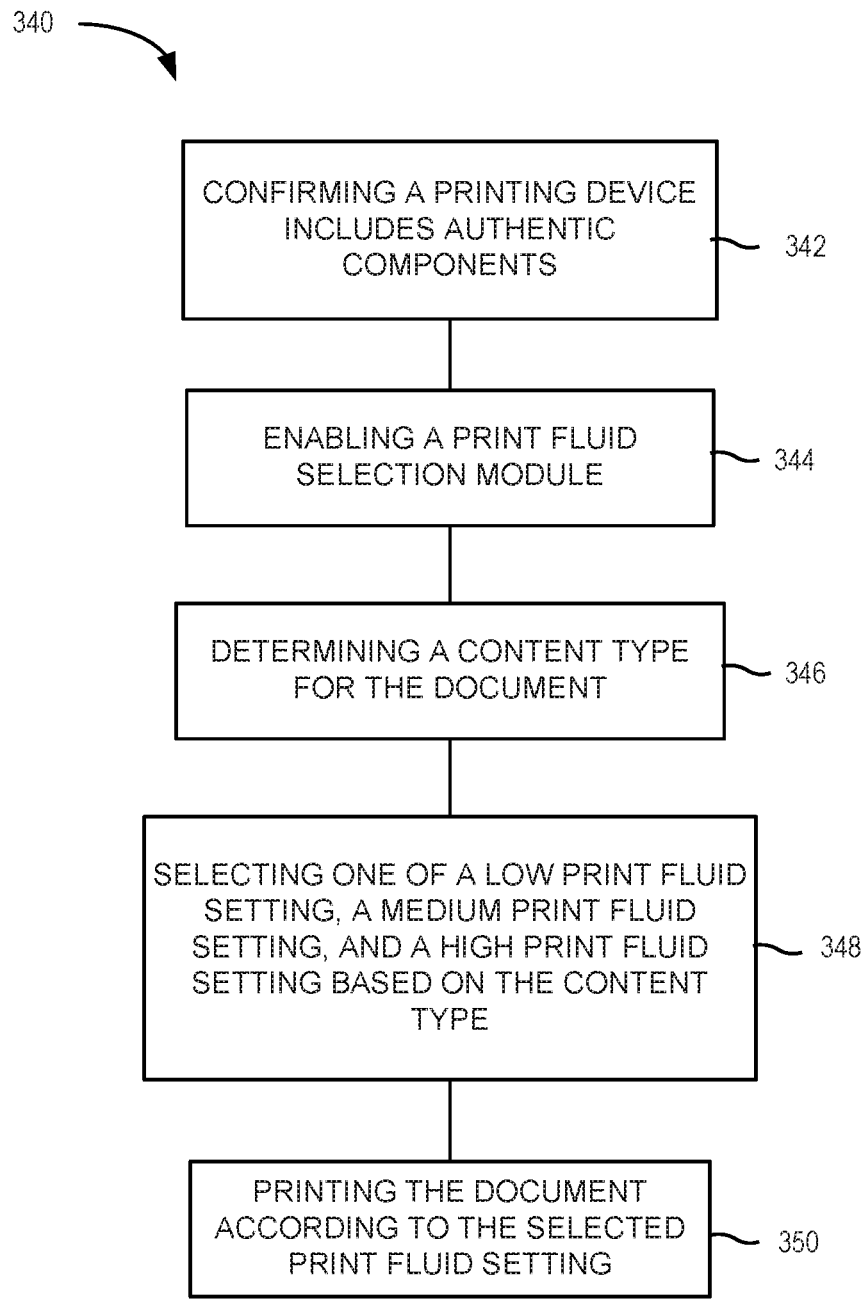
FIG. 3 illustrates an example method for print fluid selection, according to the present disclosure.

FIG. 3 illustrates an example method 340 for print fluid selection, according to the present disclosure. At 342, the method 340 may include confirming a printing device includes authentic components. For instance, as described in relation to FIGS. 1 and 2, a plurality of printing devices may be coupled to a cloud-based printing platform. Using the cloud-based printing platform, for instance, via a printing supply verification module, it may be determined whether a printing device coupled to the cloud-based printing platform includes authentic components, such as specified by a manufacturer of the printing device.

At 344, the method 340 may include enabling a print fluid selection module. For instance, the print fluid selection module may be enabled in response to confirming that the printing device includes authentic components, at 342. If, however, it is not confirmed that the printing device includes authentic components, then the method 340 may include not enabling the print fluid selection module.

At 346, the method 340 may include determining a content type for a document. As explained in relation to FIGS. 1 and 2, using the print fluid selection module, a content type may be determined for a document to be printed based on an amount of text and an amount of images in the document. For instance, as described in relation to FIG. 1, determining the content type of the document may include determining that the amount of images in the document exceeds a threshold percentage of images, and therefore the document is of a first type. Similarly, determining the content type of the document may include determining that the amount of text in the document exceeds a first threshold percentage of text, and therefore the document is of a second type. Furthermore, determining the content type of the document may include determining that the amount of text in the document exceeds a first threshold percentage of text and a second threshold percentage of text, and therefore the document is of a third type. Put another way, a document containing multiple images and lesser text may be determined to be of a first type, a document containing less pictures than the first type and more text than the first type may be determined to be of the second type, and a document containing primarily text may be determined to be of the third type.

At 348, the method 340 may include selecting one of a low print fluid setting, a medium print fluid setting, and a high print fluid setting for printing the document on the printing device based on the determined content type. As described herein, the designation of "low", "medium" and "high" are relative terms. As described in regards to FIG. 2, the "low" print fluid setting includes the least amount of document modifications; the "medium" print fluid setting includes all of the modifications from the "low" print fluid setting and additional modifications. Finally, the "high" print fluid setting includes the most document modifications to reduce printing fluid usage. As such, other designations than "low" "medium" and "high" may be used.

Also, as described in relation to FIG. 2, each document type may be associated with a print fluid setting. For instance, selecting one of the low print fluid setting, the medium print fluid setting, and the high print fluid setting may include selecting the low print setting in response to the determination that the amount of images in the document exceeds a threshold percentage of images, and therefore the document is of the first type. Similarly, selecting one of the low print fluid setting, the medium print fluid setting, and the high print fluid setting may include selecting the medium print setting in response to the determination that the amount of text in the document exceeds a first threshold percentage of text, and therefore the document is of the second type. Furthermore, selecting one of the low print fluid setting, the medium print fluid setting, and the high print fluid setting includes selecting the high print setting in response to the determination that the amount of text in the document exceeds the first threshold percentage of text and a second threshold percentage of text, and therefore the document is of the third type.

At 350, the method 340 may include printing the document according to the selected print fluid setting. For instance, the document may be printed using a printing device among the plurality of printing devices, by modifying content in the document according to the selected print fluid setting. In response to selecting the high print setting, the content of the document may be modified prior to printing by revising text, lines, and images in the document according to pre-defined settings. For example, in response to selecting the low print fluid setting, four types of modifications may be made to the document: text not in Garamond font may be changed to Garamond font (or other font format specified by a user and/or administrator), bold text may be replaced with regular text and underlined with a dotted line, bold text may be limited to 11 point size and non-bold text may be limited to 8 point size, and all solid lines may be replaced with dotted lines. Further, in response to selecting the medium print fluid setting, five types of modifications may be made to the document. In the medium print fluid setting, all of the modifications made with the low print fluid setting will also be made, and also background full page colors may be removed. Lastly, in response to selecting the high print fluid setting, eight types of modifications may be made to the document. In the high print fluid setting, all of the modifications made with the medium print fluid setting will also be made, and also picture depth may be limited to grayscale, only black cartridges may be used, and half toning may be applied to images. Put another way, in response to selecting the high print fluid setting, text, lines and images may be revised in the document according to pre-defined settings (as discussed above).

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A system for print fluid selection, comprising:
   a cloud-based printing platform coupled to a plurality of printing devices; and
   a print, fluid selection processor module implemented in the cloud-based printing platform, the print fluid selection processor module to:
   determine a type of a document to be printed by a printing device among the plurality of printing devices; and
   select a print fluid setting among a plurality of print fluid settings for printing the document, based on the determined document type, wherein the selected print fluid setting defines a change to the document based on the determined type and wherein the change comprises at least one of the following: replacing text in the document with a pre-defined font type, replacing text in the document with a pre-defined font size, replacing bold text in the document with a pre-defined text format, and replacing solid lines in the document with a pre-defined line format.

2. The system of claim 1, wherein the cloud-based printing platform includes a printing supply verification processor module to verify authenticity of components in a printing device among the plurality of printing devices in response to receiving component information from the printing device.

3. The system of claim 1, wherein the cloud-based printing platform verifies authenticity of components within a printing device among the plurality of printing devices; and
   executes the print fluid election processor module in response to the verification.

4. A non-transitory computer-readable medium containing instructions executable by a processor to cause the processor to:
   receive a request to print a document using a printing device in a cloud-based printing platform;
   assign a content type for the document based on an amount of text and an amount of images in the document;
   select a print fluid setting among a plurality of print fluid settings for printing the document on the printing device, based on the content type, wherein the selected print fluid setting defines a change to the document based on the determined type and wherein the change comprises at least one of the following: replacing text in the document with a pre-defined font type, replacing text in the document with a pre-defined font size, replacing bold text in the document with a pre-defined text format, and replacing solid lines in the document with a pre-defined line format; and print the document using the printing device and the selected print fluid setting.

5. The non-transitory computer-readable medium of claim 4, wherein the instructions to assign the content type include instructions to assign a first print fluid setting among the plurality of print fluid settings to the document in response to a determination that more than a threshold portion of the document comprises images rather than text.

6. The non-transitory computer-readable medium of claim 4, wherein the instructions to assign the content type include instructions to assign a second print fluid setting among the plurality of print fluid settings to the document in response to a determination that more than a first threshold portion and less than a second threshold portion of the document comprises text.

7. The non-transitory computer-readable medium of claim 6, wherein the instructions to print the document using the printing device and the second print fluid setting include instructions to:
modify the document according to a first print fluid setting; and
remove background full page colors in the document.

8. The non-transitory computer-readable medium of claim 4, wherein the instructions to assign the content type include instructions to assign a third print fluid setting among the plurality of print fluid settings to the document in response to a determination that more than a threshold portion of the document comprises text rather than images.

9. The non-transitory computer-readable medium of claim 8, wherein the Instructions to print the document using the printing device and the third print fluid setting include instructions to:
remove background colors in the document;
limit picture depth of the document to grayscale; and
apply half toning to images in the document.

10. A method for print selection comprising:
confirming a printing device coupled to a cloud-based printing platform includes authentic components, as specified by a manufacturer of the printing device;
enabling a print fluid selection processor module in response to confirming that the printing device includes authentic components;
using the print fluid selection processor module, determining a content type for a document based on an amount of text and an amount of images in the document;
selecting one of a low print fluid setting, a medium print fluid setting, and a high print fluid setting for printing the document on the printing device based on the determined content type, wherein the selected print fluid setting defines a change to the document based on the determined type and wherein the change comprises at least one of the following: replacing text in the document with a pre-defined font type, replacing text in the document with a pre-defined font size, replacing bold text in the document with a pre-defined text format, and replacing solid lines in the document with a pre-defined line format; and
printing the document using the printing device, by modifying content in the document according to the selected print fluid setting.

11. The method of claim 10, wherein:
determining the content type of the document includes determining that the amount of images in the document exceeds a threshold percentage of images; and
selecting one of the low print fluid setting, the medium print fluid setting, and the high print fluid setting includes selecting the low print setting in response to the determination that the amount of images in the document exceeds the threshold.

12. The method of claim 10, wherein:
determining the content type of the document includes determining that the amount of text in the document exceeds a first threshold percentage of text; and
selecting one of the low print fluid setting, the medium print fluid setting, and the high print fluid setting includes selecting the medium print setting in response to the determination that the amount of text in the document exceeds the first threshold.

13. The method of claim 10, wherein:
determining the content type of the document includes determining that the amount of text in the document exceeds a first threshold percentage of text and a second threshold percentage of text; and
selecting one of the low print fluid setting, the medium print fluid setting, and the high print fluid setting includes selecting the high print setting in response to the determination that the amount of text in the document exceeds the first threshold and the second threshold.

14. The method of claim 10, wherein:
selecting one of the low print fluid setting, the medium print fluid setting, and the high print fluid setting includes selecting the high print setting; and
in response to selecting the high print setting, revising text, lines, and images in the document according to pre-defined settings.

* * * * *

UNITED STATES PATENT AND TRADEMARK OFFICE
CERTIFICATE OF CORRECTION

PATENT NO. : 10,503,447 B2  
APPLICATION NO. : 14/966272  
DATED : December 10, 2019  
INVENTOR(S) : Kirti Kunal Shah et al.

It is certified that error appears in the above-identified patent and that said Letters Patent is hereby corrected as shown below:

On the Title Page

Column 1, item [73], Assignee, Lines 1-2, delete "Hewlett-Packard Development Company, L. P.," and insert -- Hewlett-Packard Development Company, L.P., --, therefor.

In the Claims

Column 8, Line 25, Claim 1, delete "print," and insert -- print --, therefor.

Column 8, Line 51, Claim 3, delete "election" and insert -- selection --, therefor.

Column 9, Line 34, Claim 9, delete "Instructions" and insert -- instructions --, therefor.

Column 9, Line 40, Claim 10, after "print" insert -- fluid --.

Signed and Sealed this  
Twenty-fourth Day of March, 2020

Andrei Iancu  
*Director of the United States Patent and Trademark Office*